United States Patent Office 3,431,298
Patented Mar. 4, 1969

3,431,298
PROCESS FOR THE PREPARATION OF OXADICARBOXYLIC ACIDS
Kazuo Saotome and Kenichiro Sato, Tokyo, Japan, assignors to Asahi Kasei Kogyo Kabushiki Kaisha, Osaka, Japan, a corporation of Japan
No Drawing. Filed Oct. 23, 1965, Ser. No. 504,075
Claims priority, application Japan, Jan. 5, 1965, 40/300; Feb. 3, 1965, 40/5,666, 40/5,667
U.S. Cl. 260—535          7 Claims
Int. Cl. C07c 59/22, 51/00, 55/02

ABSTRACT OF THE DISCLOSURE

Oxadicarboxylic acids of the formula:

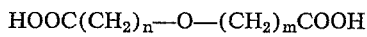
$$HOOC(CH_2)_n—O—(CH_2)_mCOOH$$

in which $n$ is 3 or 4 and $m$ is an integer of 5 to 15 are produced by a novel method which comprises heating an alcoholate of an oxycarboxylic acid salt of the formula $MO(CH_2)_m—COOM$, wherein $m$ is an integer of 5 to 15 and M is an alkali metal, with γ-butyrolactone or δ-valerolactone, dissolving the resulting alkali salt of the oxadicarboxylic acid in water, acidifying the resulting solution with a mineral acid and recovering the produced oxadicarboxylic acid.

---

This invention relates to novel oxadicarboxylic acids and to processes for preparing the same. More particularly this invention relates to novel oxadicarboxylic acids of the formula $$HOOC—(CH_2)_n—O—(CH_2)_m—COOH$$

wherein $n$ is 3 or 4 and $m$ is an integer between 5 and 15 and also relates to processes for the preparation thereof. As understandable from the chemical structure, said novel dicarboxylic acids have been found useful compounds as starting materials for the preparation of high molecular substances.

Heretofore, γ,γ'-oxadibutyric acid has been known as a plasticizer and the like. Applicants have found that the said novel non-symmetric oxadicarboxylic acids can be obtained in high yield according to a process in which γ-butyrolactone or δ-valerolactone is reacted with ω-oxycarboxylic acids or alkali salts of ω-chlorocarboxylic acids.

The process of the instant invention can be illustrated by the following equation:

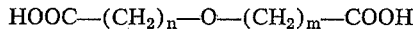
```
 ┌(CH2)n—CO  + MO(CH2)mCOOM  ——→
 └─O────┘
                 MOOC—(CH2)n—O—(CH2)m—COOM
``` wherein $m$ and $n$ are as defined above and M is an alkali or alkaline earth metal.

The procedure to carry out the present process will be illustrated as follows.

In the first place, an alkali or alkaline earth metal salt of ω-oxycarboxylic acid is converted into the alcoholate by mixing with an alkali metal. Besides the above-mentioned method, the said alcoholate can be prepared by reacting an alkali alcoholate of a lower alcohol such as methanol and then distilling off alcohol or by reacting ω-oxycarboxylic acid with twice the molar amount of caustic alkali followed by the removal of water by heating under reduced pressure. In the present process the use of alkali metal directly in the reaction, can also give good results.

In such a case it is convenient to employ a method in which the alkali metal is allowed to react in the fused state with stirring in the presence of a suitable solvent such as benzene, toluene, xylene or the like.

Alternatively, it is possible to obtain an alkali metal compound of an oxydicarboxylic acid by reacting an ω-chlorocarboxylic acid with 3 mol equivalents of caustic alkali and then heating the reaction mixture to distill off water. In this instance alkali chloride, which does not affect the subsequent reactions, is formed continuously.

The alcoholate of said oxycarboxylic acid thus obtained must be substantially anhydrous. The presence of water in the reaction system which causes the formation of symmetric oxadicarboxylic acid, as a by-product or extremely reduces the yield of the desired substance is not preferable.

Then, in an equimolar or more than equimolar amount γ-butyrolactone or δ-valerolactone is added to the alkali compound of oxydicarboxylic acid and the mixture is heated at a temperature between 200 and 280° C. in the presence of inert gas. The reaction is carried out by heating at first under reflux of lactone and then at gradually elevated temperature for several to 10 hours to produce the desired alkali salt of oxadicarboxylic acid. When cooled, the reaction mixture solidifies. It is dissolved in water. When acidified with mineral acid, the resultant aqueous solution separates the said free oxadicarboxylic acid. The pure product of free acid can be obtained in crystal form by extraction and recrystallization with suitable solvent such as ether or the like.

ω-Oxycarboxylic acids included in the present invention are those having 6 and more than 6 carbon atoms such as ε-oxycaproic acid (caprolactone), ω-oxy-enanthic acid, ω-oxypelargonic acid, ω-oxy-decanoic acid, ω-oxy-tridecanoic acid, ω-oxy-pentadecanoic acid, and the like.

ω-Chlorocarboxylic acids included in the present invention are those having 6 and more than 6 carbon atoms such as ε-chlorocaproic acid, ω-chloro-enanthic acid, ω-chloro-undecanoic acid, ω-chloro-tridecanoic acid, ω-chloropentadecanoic acid.

The following examples will further illustrate this invention but the invention is not restricted to these examples. The parts specified in the example are parts by weight unless otherwise indicated.

EXAMPLE 1

76 parts of ε-caprolactone and 75 parts of potassium hydroxide were dissolved in 100 parts of water. The reaction commenced immediately exothermically. The mixture was dehydrated by heating under reduced pressures (reduced to 2 mm. Hg in the end) up to a temperature of 240° C. over a period of about 2 hours. When cooled, the reaction product solidified into a white mass. 60 parts of γ-butyrolactone were added to the reaction product and the reaction was carried out for 9 hours while gradually elevating the reaction temperature from 220° to 250° C. When cooled, the reaction product was dissolved in water and acidified with sulfuric acid by which it separated as a precipitate. 174 parts yield (81 percent) of 5-oxaundecanedioic acid was obtained by dissolving the precipitate in ether and adding petroleum ether in order to purify by recrystallization. This compound was white crystal having a M.P. of 35° C. The structure was confirmed by acid value and elemental analysis.

EXAMPLE 2

When 26.6 parts of sodium hydroxide (pure) were added to 76 parts of ε-caprolactone and the mixture was heated at a temperature of 150° C. with stirring, the reaction commenced and a uniform product was obtained within one hour. 15.5 parts of metallic sodium dissolved in 100 parts of methanol were added to the reaction product and the mixture was heated while distilling off methanol. The temperature was elevated up to 230° C. When most of the methanol was removed, the system was evacuated down to 2 mm. Hg in order to completely remove the methanol over a period of about 2 hours.

Then 70 parts of δ-valerolactone were added to the reaction product and allowed to react with the latter at a temperature of 250° to 260° C. for 8 hours. Toward the end of the reaction period, excessive δ-valerolactone was recovered by reducing the pressure of the system. 190 parts of 6-oxadodecanedioic acid were obtained by treating the reaction product as in Example 1. (Yield 86%.)

The product was white crystal having M.P. of 53° C. Its structure was confirmed by acid value and elemental analysis.

EXAMPLE 3

12 parts of sodium dissolved in 100 parts of methanol were added to 90 parts of the sodium salt of ω-oxyenanthic acid and the mixture was heated to distil off methanol. In order to remove methanol sufficiently the heating was carried out at a temperature of 200° C. and under reduced pressure of 3 mm. Hg.

Then 60 parts of γ-butyrolactone were added to the reaction mixture. After heating under reflux for 2 hours, the temperature was elevated to 250° C. to carry out the reaction for 6 hours. Excessive γ-butyrolactone was recovered by distillation under reduced pressure.

The reaction product was cooled, dissolved in a large amount of water, acidified with sulfuric acid and extracted with ether. 94 parts yield (81 percent) of 5-oxadodecanedioic acid was obtained from the ether extract.

The product was white crystal having a boiling point of 203–205° C. (2 mm. Hg) and a melting point of 58° C. By elemental analysis, infrared spectroscopy and acid value, the structure of the product was confirmed to be identical to that of the desired substance.

EXAMPLE 4

28 parts of potassium hydroxide were added in the state of aqueous solution to 100 parts of the potassium salt of ω-oxy-enanthic acid and the mixture was heated to remove water. In order to remove water completely, heating was carried out at a temperature of 200° C., under a reduced pressure of 3 mm. Hg for 2.5 hours.

Then 65 parts of δ-valerolactone were added to the reaction mixture. The temperature was elevated to 250° C. in order to carry out the reaction for 9 hours. Then low boiling material was distilled off under reduced pressure.

After being cooled, the reaction product was treated as in Example 3 whereby 96 parts yield (78 percent) of 6-oxa-tridecanedioic acid was obtained.

The product was white crystal having a B.P. of 205° C. (2 mm. Hg) and a M.P. of 57° C. The structure was confirmed by infra-red spectroscopy, elemental analysis and acid value.

EXAMPLE 5

23 parts of metallic sodium dissolved in 120 parts of methanol were added to 87 parts of ω-oxy-pelargonic acid and methanol was distilled off as in Example 3. 60 parts of δ-valerolactone were added to the reaction product and allowed to react with the latter by heating at a temperature of 250° C. for 8 hours. The remaining δ-valerolactone was recovered from the reaction product by vacuum distillation and the reaction product was treated as in Example 1, whereby 107 parts yield (78 percent) of 6-oxapentadecanedioic acid was obtained.

The product was white crystal having a M.P. of 76° C. The structure was confirmed by infra-red spectroscopy, elemental analysis and acid value.

EXAMPLE 6

56 parts of potassium hydroxide were added in the form of a 40 percent aqueous solution to 87 parts of ω-oxypelargonic acid and water was removed by heating the mixture under a reduced pressure with grinding and stirring. In order to remove water completely, heating was carried out at a temperature of 200° C. under a reduced pressure of 3 mm. Hg for 3 hours. 55 parts of γ-butyrolactone were added and after heating under reflux for 2 hours, the reaction was effected at a temperature of 240 to 250° C. for 5 hours. The remaining γ-butyrolactone was recovered by distillation under reduced pressure and the reaction product was treated as in Example 3, whereby 104 parts yield (80 percent) of 5-oxa-tetradecanedioic acid was obtained.

The product was white crystal having a M.P. of 65° C. The structure was confirmed by infra-red spectroscopy, elemental analysis and acid value.

EXAMPLE 7

105 parts yield (77 percent) of 6-oxa-pentadecanedioic acid was obtained by using 60 parts of δ-valerolactone instead of 55 parts of γ-butyrolactone in Example 6 and carrying out the treatment of Example 6.

The product was confirmed as the same compound obtained in Example 5 from infra-red spectroscopic data and by the fact that the melting point was not lowered by mixing therewith.

EXAMPLE 8

150 parts of a methanol solution containing 23 parts of metallic sodium were added to 101 parts of ω-oxyundecanoic acid and methanol was removed by distillation as in Example 3. 50 parts of γ-butyrolactone were added to the reaction product and the mixture was heated at a temperature of 250° C. for 8 hours. The remaining γ-butyrolactone was recovered from the reaction mixture by distillation under reduced pressure. 108 parts yield (75 percent) of 5-oxa-heptadecanedioic acid was obtained by the treatment as in Example 1.

The product was white crystal having a M.P. of 75° C. The structure was confirmed by infra-red spectroscopy, elemental analysis, acid value and the like.

EXAMPLE 9

98 parts yield (65 percent) of 6-oxa-octadecanedioic acid was obtained by the same procedure as in Example 8 except that 60 parts of δ-valerolactone were used instead of γ-butyrolactone.

The product was white crystal having a M.P. of 85° C. The structure was confirmed by infra-red spectroscopy, elemental analysis, acid value and the like.

EXAMPLE 10

56 parts of potassium hydroxide in the form of a 60 percent aqueous solution were added to 101 parts of ω-oxyundecanoic acid. Water was removed by heating the mixture under reduced pressure with grinding and stirring. The heating was carried out at a temperature of 200° C. under a reduced pressure of 3 mm. Hg for 3 hours. 60 parts of γ-butyrolactone were added to the reaction mixture. After heating for 2 hours under reflux, the mixture was allowed to react at a temperature of 250° C. for 8 hours. After recovering the remaining γ-butyrolactone under reduced pressure, the reaction product was treated as in Example 3, whereby 100 parts yield (69 percent) of 5-oxaheptadecanedioic acid was obtained.

The product was the same as the compound obtained in Example 8.

EXAMPLE 11

When δ-valerolactone was used in Example 10 instead of γ-butyrolactone, 6-oxaoctadecanedioic acid was obtained. The product was the same as the compound obtained in Example 9.

EXAMPLE 12

120 parts of a methanol solution prepared by adding 23 parts of metallic sodium, were added to 129 parts of ω-oxypentadecanoic acid and methanol was removed as in Example 3. Then 50 parts of δ-valerolactone were added to the reaction product and allowed to further react at a temperature of 250° C. for 9 hours. The remaining δ-valerolactone was recovered from the reaction product by distillation in vacuo and the reaction product was treated as in Example 3 whereby 105 parts yield (59 percent) of 6-oxapentacosanedioic acid was obtained.

The product was white crystal having a M.P. of 96° C.

EXAMPLE 13

60 parts of sodium hydroxide were added as a 40 percent aqueous solution thereof to 75 parts of ε-chlorocaproic acid. The mixture was boiled for a while, then the vacuum was gradually increased and water was removed by heating under a reduced pressure of 3 mm. Hg at a temperature of 200° C. for 3 hours. Thereafter 60 parts of γ-butyrolactone were added to the reaction product. The reaction was carried out by heating at first under reflux for 2 hours and then elevating the temperature to 240 to 250° C. for 5 hours with stirring. The reaction product was dissolved in water, acidified by adding sulfuric acid and extracted with ether. 98 parts yield (82 percent) of 5-oxaundecanedioic acid crystal was obtained.

The product was the same compound as that obtained in Example 1.

EXAMPLE 14

The same procedure as in Example 13 was repeated to obtain 82 parts yield (71 percent) of 6-oxadodecanedioic acid. However 60 parts of δ-valerolactone were used instead of γ-butyrolactone in this case.

The product was the same as that obtained in Example 2.

EXAMPLE 15

84 parts of potassium hydroxide were added as a 40% aqueous solution thereof to 82 parts of ω-chloroenanthic acid. The mixture was boiled for 3 hours and heated ultimately at a temperature of 200° C., under reduced pressure for 2.5 hours to sufficiently dehydrate same. Then 65 parts of δ-valerolactone were added to this reaction product and the mixture was allowed to react by heating at a temperature of 250–260° C. for 6 hours and then further for 3 hours while maintaining the reaction system under reduced pressure in order to recover δ-valerolactone.

The reaction product was treated as in Example 1 whereby 96 parts yield of 6-oxatridecanedioic acid crystal was obtained. The product was the same compound as that obtained in Example 4.

EXAMPLE 16

When γ-butyrolactone was used instead of δ-valerolactone in Example 15, 5-oxadodecanedioic acid was obtained in 72 percent yield. The product was the same compound as that obtained in Example 3.

EXAMPLE 17

When sodium hydroxide was used in Example 15 instead of potassium hydroxide, crystals of 6-oxatridecanedioic acid was obtained in a yield of 58 percent.

EXAMPLE 18

60 parts of sodium hydroxide were added as a 40 percent aqueous solution thereof to 96 parts of ω-chloropelargonic acid. After boiling for 3 hours, the mixture was heated at a temperature of 230° C. under a reduced pressure of 3 mm. Hg for 3 hours to remove water. 60 parts of γ-butyrolactone were added to the reaction mixture and same was allowed to react with the latter as in Example 15, whereby 100 parts of 5-oxatridecanedioic acid crystal were obtained. The product had a M.P. of 65° C. and was the same compound as that obtained in Example 6.

EXAMPLE 19

84 parts of potassium hydroxide were added as a 40 percent aqueous solution thereof to 96 parts of ω-chloropelargonic acid. After boiling for 3 hours, the mixture was heated sufficiently at a temperature of 220° C. for 3 hours under a reduced pressure of 2 mm. Hg to remove water. 66 parts of δ-valerolactone were added to the reaction product, and same was allowed to react with the latter as in Example 15 whereby 85 parts of 6-oxapentadecanedioic acid were obtained. The product was white crystal having a M.P. of 76° C. and confirmed to be the same compound as that obtained in Example 5.

EXAMPLE 20

84 parts of potassium hydroxide were added as a 40 percent aqueous solution thereof to 100 parts of ω-chloroundecanoic acid. After boiling for 3 hours, the mixture was heated at a temperature of 200° C. under a reduced pressure of 2 mm. Hg for 3 hours to remove water. 60 parts of δ-valerolactone were added to the reaction mixture and allowed to react with the latter as in Example 15 to obtain 79 parts of 6-oxa-octadecanedioic acid. The product was the same compound as that in Example 9.

EXAMPLE 21

When γ-butyrolactone was used in Example 20 instead of δ-valerolactone, 5-oxaheptadecanedioic acid, the same compound as in Example 8, was obtained in a yield of 59 percent.

EXAMPLE 22

85 parts of potassium hydroxide were added as a 40 percent aqueous solution thereof to 125 parts of ω-chlorotridecanoic acid. After heating for 3 hours, the mixture was subjected to dehydration by sufficiently heating same at a temperature of 200° C., under reduced pressure of 3 mm. Hg for 3 hours. 50 parts of γ-butyrolactone were added to the reaction mixture and by the same treatment as in Example 15, 95 parts yield (60 percent) of 5-oxa-octadecanedioic acid was obtained. The product was white crystal having a M.P. of 84° C. The structure was determined by infra-red spectroscopy, elemental analysis and acid value.

EXAMPLE 23

60 parts of sodium hydroxide were added to 129 parts of ω-chloropentadecanoic acid and 72 parts of 5-oxaeicosanedioic acid were obtained by the same treatment as in Example 22. The product was white crystal having a M.P. of 91° C. The structure was confirmed by infrared spectroscopy, elemental analysis and acid value.

What we claim is:

1. A process for producing an oxadicarboxylic acid of the formula:

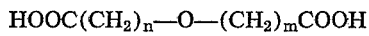
$$HOOC(CH_2)_n-O-(CH_2)_mCOOH$$

wherein $n$ is 3 or 4 and $m$ is an integer between 5 and 15, inclusive, said process comprising heating an alcoholate of an oxycarboxylic acid salt of the formula:

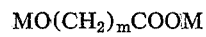
$$MO(CH_2)_mCOOM$$

wherein $m$ is defined above and M is an alkali metal, with γ-butyrolactone or δ-valerolactone at a temperature of 200° to 280° C. to form an alkali salt of the oxadicarboxylic acid, dissolving said alkali salt of the oxadicarboxylic acid in water, acidifying the resulting solution with a mineral acid to free the oxadicarboxylic acid from the salt thereof and recovering the thusly freed oxadicarboxylic acid from said aqueous solution.

2. A process according to claim 1, wherein heating is effected in the presence of an inert gas.

3. A process according to claim 1, wherein the alcoholate is prepared by reacting a compound selected from the group consisting of

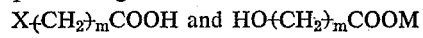
$$X(CH_2)_mCOOH \text{ and } HO(CH_2)_mCOOM$$

wherein $m$ is an integer between 5 and 15, M is an alkali metal and X is —OH or —Cl with an alkali metal or an alkali metal hydroxide.

4. A process according to claim 3, wherein the reaction for preparing the alcoholate is effected under substantially anhydrous conditions in the presence of an oragnic solvent.

5. A process according to claim 4, wherein the solvent is methanol, benzene, toluene or xylene.

6. A process according to claim 1, wherein the alcoholate is prepared by reacting ε-caprolactone with an alkali metal hydroxide.

7. A process according to claim 6, wherein the reaction for preparing the alcoholate is effected under substantially anhydrous conditions.

References Cited

UNITED STATES PATENTS

| 2,369,640 | 2/1945 | Barnum | 260—535 XR |
| 2,963,371 | 12/1960 | Young et al. | 260—535 XR |
| 2,352,641 | 7/1944 | Kung | 260—535 |
| 2,623,031 | 12/1952 | Snyder | 260—860 |
| 2,623,033 | 12/1952 | Snyder | 260—75 |
| 2,725,309 | 11/1955 | Rodman | 260—860 XR |

FOREIGN PATENTS 836,936  4/1952  Germany.

LORRAINE A. WEINBERGER, *Primary Examiner.*

A. P. HALLUIN, *Assistant Examiner.*